(12) United States Patent
Werner

(10) Patent No.: US 12,229,908 B2
(45) Date of Patent: Feb. 18, 2025

(54) INTERACTIVE VIRTUAL REALITY SYSTEM

(71) Applicant: Bytedance Inc., Wilmington, DE (US)

(72) Inventor: Scott Werner, Palo Alto, CA (US)

(73) Assignee: Bytedance Inc., Wilmington, DE (US)

( * ) Notice: Subject to any disclaimer, the term of this patent is extended or adjusted under 35 U.S.C. 154(b) by 0 days.

(21) Appl. No.: 18/503,826

(22) Filed: Nov. 7, 2023

(65) Prior Publication Data

US 2024/0177433 A1 May 30, 2024

Related U.S. Application Data

(63) Continuation of application No. 18/153,766, filed on Jan. 12, 2023, now Pat. No. 11,847,754, which is a continuation of application No. 17/445,003, filed on Aug. 13, 2021, now Pat. No. 11,580,708, which is a continuation of application No. 16/828,595, filed on Mar. 24, 2020, now Pat. No. 11,120,635, which is a continuation of application No. 16/447,423, filed on Jun. 20, 2019, now Pat. No. 10,650,606, which is a continuation of application No. 15/281,024, filed on Sep. 29, 2016, now Pat. No. 10,373,383.

(Continued)

(51) Int. Cl.
| | |
|---|---|
| G06T 19/00 | (2011.01) |
| G06F 3/01 | (2006.01) |
| G06F 3/14 | (2006.01) |
| G06F 3/147 | (2006.01) |
| G06F 3/16 | (2006.01) |
| G06Q 10/087 | (2023.01) |
| G06Q 20/40 | (2012.01) |
| G09G 3/00 | (2006.01) |
| G09G 5/14 | (2006.01) |

(52) U.S. Cl.
CPC ............ *G06T 19/006* (2013.01); *G06F 3/011* (2013.01); *G06F 3/1454* (2013.01); *G06F 3/147* (2013.01); *G06F 3/167* (2013.01); *G06Q 10/087* (2013.01); *G06Q 20/4014* (2013.01); *G09G 3/003* (2013.01); *G09G 5/14* (2013.01); *G09G 2358/00* (2013.01)

(58) Field of Classification Search
CPC .............................. G06T 19/006; G06F 3/011
USPC ......................................................... 345/419
See application file for complete search history.

(56) References Cited

U.S. PATENT DOCUMENTS

| 8,355,948 B2 | 1/2013 | Mason |
| 9,824,391 B2 | 11/2017 | Glazer et al. |

(Continued)

OTHER PUBLICATIONS

Speicher, Marco, Shopping in Virtual Reality; Mar. 1, 2018; 2018 IEEE Conference on Virtual Reality and 3D User Interfaces (VR), pp. 1-2, 2018.

(Continued)

*Primary Examiner* — Thomas J Lett
(74) *Attorney, Agent, or Firm* — Alston & Bird LLP

(57) ABSTRACT

Provided herein are method, apparatus, and computer program products for generating a first and second three dimensional interactive environment. The first three dimensional interactive environment may contain one or more engageable virtual interfaces that correspond to one or more items. Upon engagement with a virtual interface the second three dimensional interactive environment is produced to virtual simulation related to the one or more items.

20 Claims, 8 Drawing Sheets

Related U.S. Application Data

(60) Provisional application No. 62/235,242, filed on Sep. 30, 2015.

(56) References Cited

U.S. PATENT DOCUMENTS

| | | | |
|---|---|---|---|
| 10,929,889 | B1 | 2/2021 | Aggarwal et al. |
| 2005/0021472 | A1 | 1/2005 | Gettman et al. |
| 2005/0128212 | A1 | 6/2005 | Edecker et al. |
| 2007/0179867 | A1 | 8/2007 | Glazer et al. |
| 2008/0043013 | A1 | 2/2008 | Gruttadauria et al. |
| 2008/0235630 | A1 | 9/2008 | Kenney |
| 2009/0037291 | A1 | 2/2009 | Dawson et al. |
| 2009/0113349 | A1 | 4/2009 | Zohar et al. |
| 2010/0149093 | A1 | 6/2010 | Edwards |
| 2010/0205043 | A1 | 8/2010 | Edwards |
| 2011/0010266 | A1 | 1/2011 | Edwards |
| 2011/0078052 | A1 | 3/2011 | Ciptawilangga |
| 2012/0069131 | A1* | 3/2012 | Abelow ............ G06Q 30/0601 345/589 |
| 2012/0089488 | A1 | 4/2012 | Letchford |
| 2013/0066750 | A1 | 3/2013 | Siddique et al. |
| 2014/0063061 | A1 | 3/2014 | Reitan |
| 2014/0081776 | A1* | 3/2014 | King ................ G06Q 20/384 705/44 |
| 2014/0214629 | A1 | 7/2014 | Azam et al. |
| 2014/0264767 | A1 | 9/2014 | Gratz et al. |
| 2014/0279422 | A1 | 9/2014 | Holman et al. |
| 2014/0282137 | A1 | 9/2014 | Lin et al. |
| 2015/0178822 | A1 | 6/2015 | Babiarz et al. |
| 2015/0262115 | A1 | 9/2015 | Meulenberg et al. |
| 2015/0309705 | A1 | 10/2015 | Keeler et al. |
| 2016/0048908 | A1 | 2/2016 | Sibai et al. |
| 2016/0140632 | A1 | 5/2016 | Kandala et al. |
| 2016/0180449 | A1 | 6/2016 | Naware et al. |
| 2016/0210602 | A1 | 7/2016 | Siddique et al. |
| 2017/0148073 | A1 | 5/2017 | Nomula et al. |
| 2017/0228931 | A1 | 8/2017 | Parker et al. |
| 2017/0249693 | A1 | 8/2017 | Greenwood et al. |
| 2018/0137561 | A1* | 5/2018 | Glazer ............... G06Q 30/0641 |
| 2019/0188781 | A1 | 6/2019 | O'Brien et al. |

OTHER PUBLICATIONS

U.S. Application filed on Mar. 2, 2012; In re: O'Brien et al., entitled "Relevance System for Consumer Deals", U.S. Appl. No. 13/411,502.

U.S. Appl. No. 18/153,766, filed Jan. 12, 2023, U.S. Pat. No. 11,847,754, Issued.

U.S. Appl. No. 17/445,003, filed Aug. 13, 2021, U.S. Pat. No. 11,580,708, Issued.

U.S. Appl. No. 16/828,595, filed Mar. 24, 2020, U.S. Pat. No. 11,120,635, Issued.

U.S. Appl. No. 16/447,423, filed Jun. 20, 2019, U.S. Pat. No. 10,650,606, Issued.

U.S. Appl. No. 15/281,024, filed Sep. 29, 2016, U.S. Pat. No. 10,373,383, Issued.

* cited by examiner

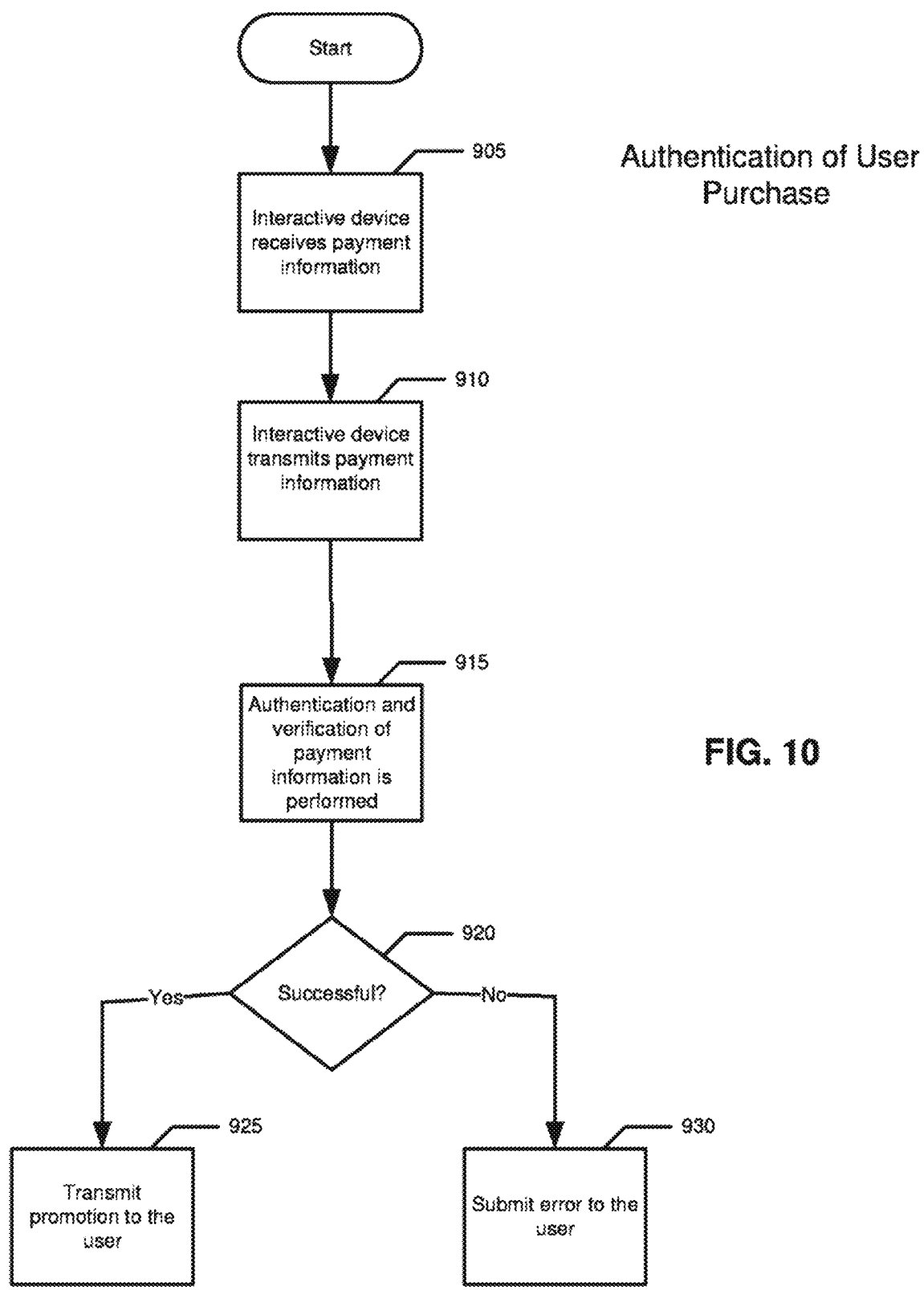

INTERACTIVE VIRTUAL REALITY SYSTEM

CROSS-REFERENCE TO RELATED APPLICATIONS

This application is a continuation of U.S. Non-Provisional patent application Ser. No. 18/153,766, entitled "Interactive Virtual Reality System," filed Jan. 12, 2023, which is a continuation of U.S. Non-Provisional patent application Ser. No. 17/445,003, entitled "Interactive Virtual Reality System," filed Aug. 13, 2021 (now U.S. Pat. No. 11,580,708), which is a continuation of U.S. Non-Provisional patent application Ser. No. 16/828,595, entitled "Interactive Virtual Reality System," filed Mar. 24, 2020 (now U.S. Pat. No. 11,120,635), which is a continuation of U.S. Non-Provisional patent application Ser. No. 16/447,423, entitled "Interactive Virtual Reality System," filed Jun. 20, 2019 (now U.S. Pat. No. 10,650,606), which is a continuation of U.S. Non-Provisional patent application Ser. No. 15/281,024, entitled "Interactive Virtual Reality System," filed Sep. 29, 2016 (now U.S. Pat. No. 10,373,383), which claims priority to and the benefit of U.S. Provisional Application No. 62/235,242, entitled "Interactive Virtual Reality System," filed Sep. 30, 2015, the contents of each are incorporated herein by reference in its entirety.

BACKGROUND OF THE INVENTION

Virtual reality systems provide a computer simulated replication of a physical environment. Applicant has identified a number of deficiencies and problems associated with conventional virtual reality systems. Through applied effort, ingenuity, and innovation, many of these identified problems have been solved by developing solutions that are included in embodiments of the present invention, which are described in detail herein.

BRIEF SUMMARY

In general embodiments of the present invention provided herein include methods, apparatus, and computer program products for an interactive device that generates and outputs first and second three dimensional interactive environments.

In some embodiments, an interactive device may comprise a processor and a memory associated with the processor having computer coded instructions configured to, with the processor, cause the interactive device to receive three dimensional environment data and generate first and second three dimensional interactive environment based on the three dimensional environmental data. The interactive device may receive inventory data. The interactive device may determine one or more virtual interfaces for presenting within the first three dimensional interactive environment, wherein the one or more virtual interfaces are determined based on the inventory data and the three dimensional environmental data, and wherein the one or more virtual interfaces comprise an execution component to generate execution data and a virtual experience portal. The virtual device may output, to a display of the interactive device, the first three dimensional interactive environment and the one or more virtual interfaces. The virtual device may receive user input data generated in association with user engagement of the interactive device and in circumstances where the user input data indicates user engagement with the execution component of the one or more virtual interfaces, store the associated execution data to a user execution registry and in circumstances where the user input data indicates user engagement with the virtual experience portal of the one or more virtual interfaces, output to the display the second three dimensional interactive environment.

In some embodiments, the interactive device may comprise communication circuitry configured to generate a network connection with other interactive devices, wherein the interactive device and other interactive devices substantially simultaneously output, to respective displays of the interactive device and the other interactive devices, shared versions of the first or second three dimensional interactive environment.

In some embodiments, the three dimensional environment data comprises profile data.

In some embodiments, the three dimensional environment data comprises a relevance system.

In some embodiments, the engageability of the execution portion of the one or more virtual interfaces is based on the inventory data.

In some embodiments, the user input data comprises audio data, wherein the processor causes the interactive device to activate the execution component in response to comparing the audio data to a sensor database.

In some embodiments, the second three dimensional interactive environment is generated based on item data.

In some embodiments, the second three dimensional interactive environment comprises a virtual simulation of a part of at least one of: a vacation, a concert, or a trip.

In some embodiments, the second three dimensional interactive environment comprises a virtual rendering of a good.

In some embodiments, the item data comprises user feedback data.

In some embodiments, a method is provided for presenting, via an interactive device, an interactive three dimensional environment, the method may comprise receiving, by a processor, three dimensional environmental data; generating, by the processor, a first three dimensional interactive environment based on the three dimensional environmental data; generating, by the processor, a second three dimensional interactive environment based on the three dimensional environmental data; receiving, by the processor, inventory data; determining, by the processor, one or more virtual interfaces for presenting within the first three dimensional interactive environment, wherein the one or more virtual interfaces are determined based on the inventory data and the three dimensional environmental data, and wherein the one or more virtual interfaces comprise an execution component to generate execution data and a virtual experience portal; outputting, by the processor, to a display of the interactive device, the first three dimensional interactive environment and the one or more virtual interfaces; receiving, by the processor, user input data generated in association with user engagement of the interactive device; in circumstances where the user input data indicates user engagement with the execution component of the one or more virtual interfaces, storing, by the processor, the associated execution data to a user execution registry; and in circumstances where the user input data indicates user engagement with the virtual experience portal of the one or more virtual interfaces, outputting, by the processor, to the display the second three dimensional interactive environment.

In some embodiments, the method may further comprise connecting, by communication circuitry, the interactive device to other interactive devices and simultaneously outputting, by the interactive device and other interactive devices a shared first 3D interactive environment or second 3D interactive environment.

In some embodiments, the three dimensional environment data comprises profile data.

In some embodiments, the three dimensional environment data comprises a relevant system.

In some embodiments, the engageability of the execution portion of the one or more virtual interfaces is based on the inventory data.

In some embodiments, the method may further comprise receiving, by the processor, audio data, comparing, by the processor, received audio data with data in a sensor database, activating, by the processor, the execution component based the comparison.

In some embodiments, the method may further comprise generating, by the processor, the second three dimensional interactive environment based on item data.

In some embodiments, the second three dimensional interactive environment comprises a virtual simulation of a part of a least at least one of: a vacation, a concert, or a trip.

In some embodiments, the second three dimensional interactive environment comprises a virtual rendering of a good.

In some embodiments, the item data comprises user feedback data.

In some embodiments, a computer program product is provided comprising non-transitory computer readable storage medium and computer program instructions stored therein. The computer program instructions comprising program instructions configured to: receive, by a processor, three dimensional environmental data; generate, via the processor, a first three dimensional interactive environment based on the three dimensional environmental data generate, via the processor, a second three dimensional interactive environment based on the three dimensional environmental data receive, via the processor, inventory data; determine, via the processor, one or more virtual interfaces for presenting within the first three dimensional interactive environment, wherein the one or more virtual interfaces are determined based on the inventory data and the three dimensional environmental data, and wherein the one or more virtual interfaces comprise an execution component generates execution data and a virtual experience portal; output, via the processor, to a display of the interactive device, the first three dimensional interactive environment and the one or more virtual interfaces; receive, via the processor, user input data generated in association with user engagement of the interactive device; in circumstances where the user input data indicates user engagement with the execution component of the one or more virtual interfaces, store, via the processor, the associated execution data to a user execution registry; and in circumstances where the user input data indicates user engagement with the virtual experience portal of the one or more virtual interfaces, output, via the processor, to the display the second three dimensional interactive environment.

In some embodiments, the computer program product may be further configured to communicate, via communication circuitry to other interactive devices, and simultaneously output, via the interactive device and other interactive devices a shared first 3D interactive environment or second 3D interactive environment.

In some embodiments, the three dimensional environment data comprises profile data In some embodiments, the three dimensional environment data comprises a relevance system.

In some embodiments, the status of the execution portion of the one or more virtual interfaces is based on the inventory data.

In some embodiments, the computer program may be further configured to receive, via the processor, audio data; compare, via the process, received audio data with data in a sensor database; activate, by the processor, the execution component based on the comparison.

In some embodiments, the computer program may be further configured to generated, via the processor, the second three dimensional interactive environment based on item data.

In some embodiments, the second three dimensional interactive environment comprises a virtual simulation of a part of a least one of: a vacation, a concert, or a trip.

In some embodiments, the second three dimensional interactive environment comprises a virtual rendering of a good.

In some embodiments, the item data comprises user feedback data.

BRIEF DESCRIPTION OF DRAWINGS

Reference will now be made to the accompanying drawings, which are not necessarily drawn to scale, and wherein:

FIG. 10 illustrates a flow diagram of an example system configured in accordance with some embodiments discussed herein.

DETAILED DESCRIPTION OF THE DRAWINGS

Figure 1:
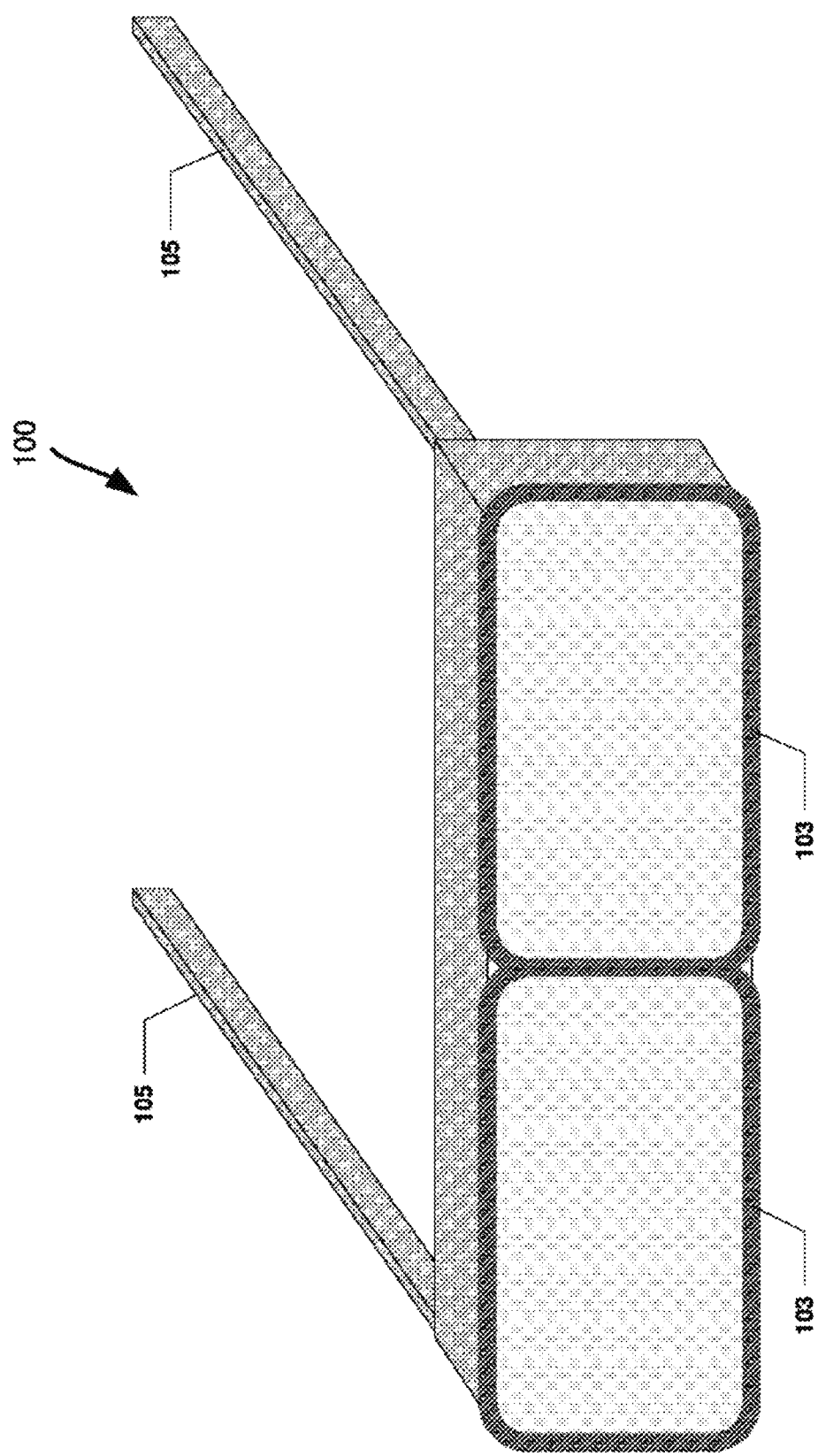
FIG. 1 illustrates an example interactive device.

Some embodiments of the present invention will now be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Terms

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may include, but is not limited to, a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a running company that sells attire that is generally used by a person who runs or participates in athletic activities.

As used herein, the term "user" may include, but is not limited to, a person utilizing an interactive device as described herein.

As used herein, the term "promotion" may include, but is not limited to, any type of offered, presented or otherwise indicated reward, discount, coupon, credit, deal, incentive, discount, media or the like that is indicative of a provider value or the like that upon purchase or acceptance results in the issuance of an instrument that may be used toward at least a portion of the purchase of particular item(s) defined by the promotion. An example promotion, using the aforementioned running company as the example provider, is $25 for $50 toward running shoes (i.e., an item). In some examples, the promotion defines an accepted value (e.g., a cost to purchase the promotion), a provider value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the provider value is $50. In this example, the residual value may be equal to the accepted value.

As used herein, the term "item" refers to any product, good, service, experience, or other tangible or intangible item. A virtual representation of an item may be displayed by an interactive device. For example, an item may be a concert, a trip, a vacation, and/or a physical object such as a lamp, a book, running shoes, or a computer.

As used herein, the term "feature" refers to the size, shape, color, text, highlighting, shading, opacity, image overlay, texture, or any other discernible attribute of a virtual representation of an item.

As used herein, the term "item data" refers to any data related to an item such as, but not limited to, provider database data, promotion and marketing services database data, and user database data.

As used herein, the term "profile identifier" refers to any data that identifies a user, provider, provider employee, or promotion and marketing service. For example, and without limitation, a profile identifier may include a unique identifier, an IP address, a MAC address, a merchant identifier, a customer identifier, a serialized code, a pseudo random code, and the like.

As used herein, the term "profile data" refers to any data associated with a profile identifier, such as, but not limited to, transaction data, biographical data, preference data, or any other data that may serve to distinguish one or more profiles from each other.

As used herein, the term "transaction data" refers to any item or profile data related to the buying, selling, or offering of an item, such as, but not limited to, sales data correlated to item, sales data correlated to provider, sales data correlated to geographic location, sales data including historical and predicted revenue for each item, historical and predicted profits for each item, quantities sold for each item, quantity of customers purchasing each item, overall selection rate of each item, popularity of an item (e.g., numbers ordered, impression views, impression clicks, etc.), or a selection rate per transaction or per customer of each item. Transaction data may also include redemption data, in the case of a promotion that must be redeemed, or may include return data for an item or promotion that is returned. In some embodiments, transaction data may include a consumer rating of an item. The transaction data may also include transactions with respect to profile information, such as transactions involving a single profile or related group of profiles.

As used herein, the term "biographical data" refers to information associated with a person(s) (e.g., user, provider, provider employee, etc.) identified in a profile, such as, for example, birth dates, allergies, socio-economic data, interests, place of residence, place of employment, login credential information, registration data, payment data (e.g., credit card data, etc.) and/or any other identifying information about a profile.

As used herein, the term "preference data" refers to one or more options associated with a profile, such that the preference data tracks the profile holder's interests and selections for various user-selectable interface options. Preference data may also include, without limitation, location data (e.g., GPS data, operating system location, etc.) associated with activity of a user associated with a profile, social media likes and dislikes, internet browser cookie data, internet browser history data, and other data that may be expressly or implicitly tracked by an interactive device that may be suggestive of user preferences.

As used herein, the term "virtual reality" refers to the computer-generated simulation of a three-dimensional image or environment (e.g., a three dimensional interactive environment) that can be interacted with in a seemingly real or physical way (i.e., through computer generated sensory stimuli) by a person using an interactive device.

Figure 5:
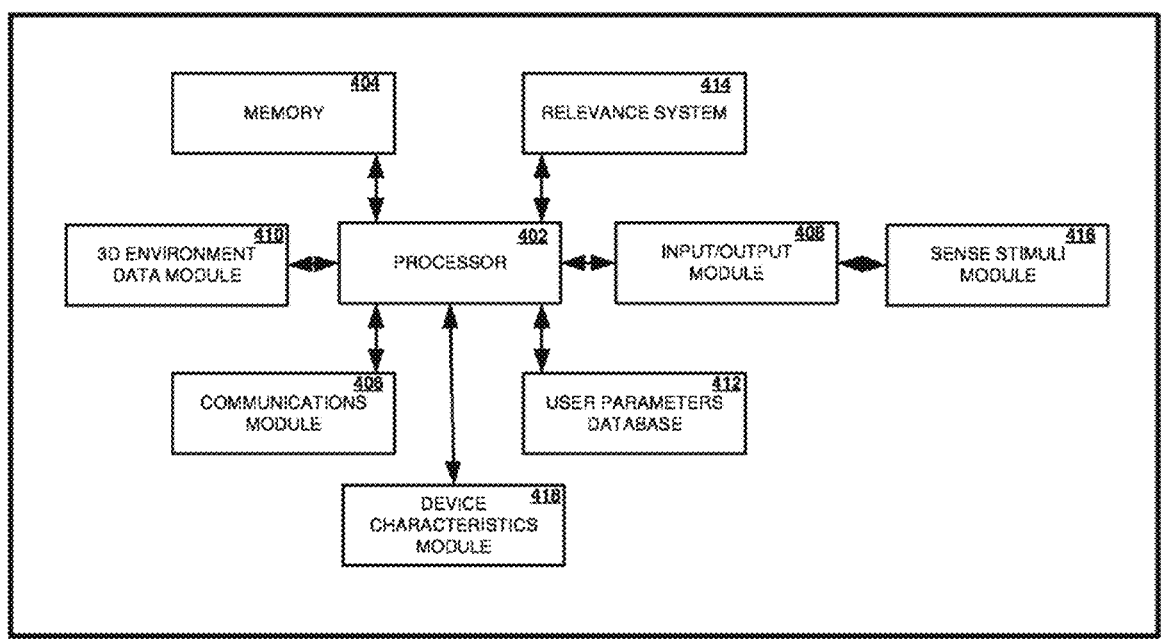
FIG. 5 illustrates a schematic block diagram of circuitry configured for a computer device, such as an interactive device, provider system, promotion and/or marketing service system, in accordance with some embodiments discussed herein.

As used herein, the term "interactive device" refers to a device that receives three dimensional environmental data and generates and outputs a first and second three dimensional interactive environment based on the received three dimensional environmental data. The first and second three dimensional interactive environments allows a user to interact with a computer-generated simulation of a three-dimensional image or environment in a seemingly real or physical way using electronic equipment (e.g., the interactive device and/or components or accessories thereof). The interactive device may be a wearable device attached to a user's head that produces one or more three dimensional interactive environments, such that the user may interact with the one or more three dimensional interactive environment in a seemingly real or physical way. An interactive device may comprise one or more hardware and software elements as illustrated in FIG. 5. An example interactive device is shown in FIG. 1 and may include, without limitation, an Oculus Rift™ by Facebook Corp.™, Sony Morpheus™ by Sony Corp.™, a mobile device combined with Google Cardboard™ by Google Corp.™ or HTC Vive™ by HTC Corp.™. The interactive device is configured to interact with a user. The interactive device may also comprise of technologies to stimulate the user's senses, such as a heater or fan to simulate weather, an odor generator to simulate smell, and haptic feedback device to simulate touch/feeling.

As used herein, the term "user payment information" refers to any form of payment identification capable of being used to purchase goods, services, promotions, or items. For example, user payment information may be a credit card number, PayPal™ log-in information, and the like.

As used herein, the term "display" refers to any type of display capable of rendering and displaying three dimensional images or three dimensional like images. For example, a display may be a computer screen, a stereoscopic display, head mounted display, display of a mobile device, and the like.

As used herein, the term "virtual interfaces" refers to any type of interactive device (e.g., user) engageable visual representation, rendering, icon, or avatar that is generated within a three dimensional interactive environment. In some embodiments, a virtual interface may comprise an execution component and a virtual experience portal. Virtual interfaces may include three dimensional interface environment rendered posters, pictures, signs, banners, billboards, emblems, drawings, and the like.

As used herein, the term "three dimensional environment data" refers to any data, information, and or machine instructions that may be used to determine, generate, and customize a three dimensional interactive environment. For example, three dimensional environmental data may include user preferences, user parameters database data, provider database data, promotion and marketing service database data, user database data, user input data, interactive device data, sense stimuli module data, device characteristic module data, and the like.

As used herein, the term "three dimensional interactive environment" refers to a computer generated interactive virtual reality environment, setting, or experience whereby a user perceives and/or engages with the three dimensional interactive environment through sensory stimuli (e.g., three dimensional video, audio, haptic stimuli, etc.) generated by an interactive device. In some embodiments, a three dimensional interactive environment is accessible through a virtual experience portal. In further embodiments, a three dimensional interactive environment may be a virtual reality shopping mall, a virtual reality office, a virtual reality simulation corresponding to an item and/or use of an item and the like.

As used herein, the term "inventory data" refers to a measurable quantity of an available item and/or promotion relating to an item. Inventory data may be kept in an "inventory registry." For example, inventory data may be the remaining amount of purchasable promotions corresponding items.

As used herein the term "execution component" refers to a virtually selectable object. Selection of the execution component generates execution data and/or activates a virtual experience portal. The execution component may be integrated into various aspects of the three dimensional interactive environment and/or virtual interfaces. For example, in the instance where a virtual interface is a virtually rendered image configured to suggest a real-world "poster" or wall affixed advertisement, the execution component may be an icon rendered on or proximate to the "poster" that upon selection allows the user to purchase a promotion or activate a virtual experience portal associated with the promotion.

As used herein, the term "execution data" refers to information relating to the selection of the execution component or engagement of the execution component by a user via the interactive device. Execution data may indicate purchase information, user payment information, promotion identification, inventory data and the like. Execution data may include an interactive device ID or serial number, a virtual interface ID, a time stamp including time of execution component engagement, and other data that may capture or otherwise indicate a user's virtual engagement with an execution component.

As used herein, the term "virtual experience portal" refers to a computer generated door, avatar, banner, poster, icon, or other programmatically generated object that is configured to transition the display output of the interactive device from one three dimensional interactive environment to another three dimensional interactive environment.

As used herein, the term "user input data" refers to data indicative of user engagement/interaction with the interactive device and/or the three dimensional interactive environment. For example, user input data may be accelerometer, GPS, gyroscope, tactile sensor, optical position sensor, heart rate monitor, blood pressure sensor, and other data that is indicative of user movements that is produced by or communicated through the interactive device (or any accessory or component thereof) or an associated user device. User input data may also be data indicating a user's navigation intent (i.e., through a virtual experience portal) or engagement with a three dimensional interactive environment (e.g., virtual selection or clicking of an execution component or audio selection of an execution component).

As used herein, the term "execution registry" refers to a database, module, or system that collects, manages, and analyzes execution data. In circumstances where the execution data is generated from user engagement of the execution component, the execution registry may be updated with execution data generated in association with or triggered by such user engagement. For example, the execution data may include data, information, or instructions that indicates a user intent to purchase a promotion associated with a virtual interface, and the execution registry may be updated to reduce the amount of available promotions (e.g. inventory data.)

As used herein the term "sensor registry" or "sensor data registry" refers to a database, module, registry or system collection that collects, manages, and analyzes user input data to determine interactive inputs and commands (e.g. navigation or engagement) within a three dimensional interactive environment.

Interactive Device

FIG. 1 depicts an example of an interactive device 100 that is configured to give a user a virtual experience. The interactive device 100 may be any network connected device that is capable of producing a three dimensional (3D) interactive environment. Interactive device 100 may include attachment mechanism 105 that is configured to physically attach to a user's body (e.g., the user's face). The illustrated interactive device 100 is a virtual reality device that is mounted around the user's eyes (the user is not shown). The interactive device may be an Oculus Rift™ by Facebook Corp.™, Sony Morpheus™ by Sony Corp.™, a mobile device combined with Google Cardboard™ by Google Corp.™ or HTC Vive™ by HTC Corp.™

Illustrated interactive device 100 contains display 103. Display 103 includes two different 3D capable display elements. In other embodiments, display 103 may be embodied as a single lens that spans across the front surface of interactive device 100 (e.g., a visor). Display 103 may be implemented by 3D capable lenses or any other device that is configured to display 3D interactive environments. In some embodiments, display 103 may also be implemented by a screen that is not able to render a 3D interactive environment. For example, display 103 may be a screen of a mobile device that alone cannot produce 3D interactive environment, but may be capable of producing 3D interactive environment when paired with another device (e.g., Google Cardboard™.)

Interactive device 100 may be coupled to a user device (not pictured), such as, a mobile phone, a computer, a tablet, controller, or the like. The user device may provide processing and/or navigation support for interactive device 100. The user device may provide processing support the interactive device 100 for aiding in producing a 3D interactive environment and interactions/experiences inside 3D interactive environment. The user device may provide navigation support to the interactive device 100 to assist the user of interactive device 100 in navigating the interactive 3D interactive environment and interactions/experiences inside 3D interactive environment.

In some embodiments, as discussed in detail below, the depicted interactive device 100 is configured to produce a 3D interactive environment. In one embodiment, the interactive device 100 includes a processor that generates first and second 3D interactive environments, wherein the first 3D interactive environment comprises at least one or more virtual interfaces relating to various items. For example, the depicted interactive device outputs an interactive 3D virtual shopping mall as a first 3D interactive environment. The interactive device receives user input data triggering virtual movement of the user around and throughout the interactive 3D shopping mall. For example, the interactive device may receive accelerometer data generated by an accelerometer of the interactive device as user input data indicating a user is moving his/her head (e.g., when wearing a head mounted interactive device) and, in response, the interactive device modifies the 3D interactive environment to simulate the same virtual head movement inside the 3D interactive environment.

The 3D interactive environment may also include a virtual concierge who assists the user in the 3D interactive environment. In some embodiments, the virtual concierge is rendered in human form to emulate a real world concierge. The user may interact with the virtual concierge in the same manner a consumer would interact with a real-life concierge. For example, the user may ask the concierge where a certain virtual interface is located within the 3D interactive environment. In other embodiments, the virtual concierge may act as technical support for the user. For example, the user may ask the concierge tips for making the 3D interactive environment run at a smooth frame rate. In one embodiment, the virtual concierge may escort the user around the 3D interactive environment and indicate and/or explain new features of the 3D interactive environment (e.g., new stores, new virtual interfaces, new promotions and the like) since the user's last visit to the 3D interactive environment. The virtual concierge may act as a medium for the user to set up alerts (e.g., send an alert when there are new promotions related to concerts) or notifications (e.g. this week concert promotions are 30% off) for promotions offered in the 3D interactive environment. The virtual concierge may use data from the 3D dimensional environment data (described below) to determine which notifications to send to the user. The virtual concierge may be controlled in real-time by a remote entity (e.g., a provider, a promotion and marketing service provider, information technology company, and the like).

Figure 2:
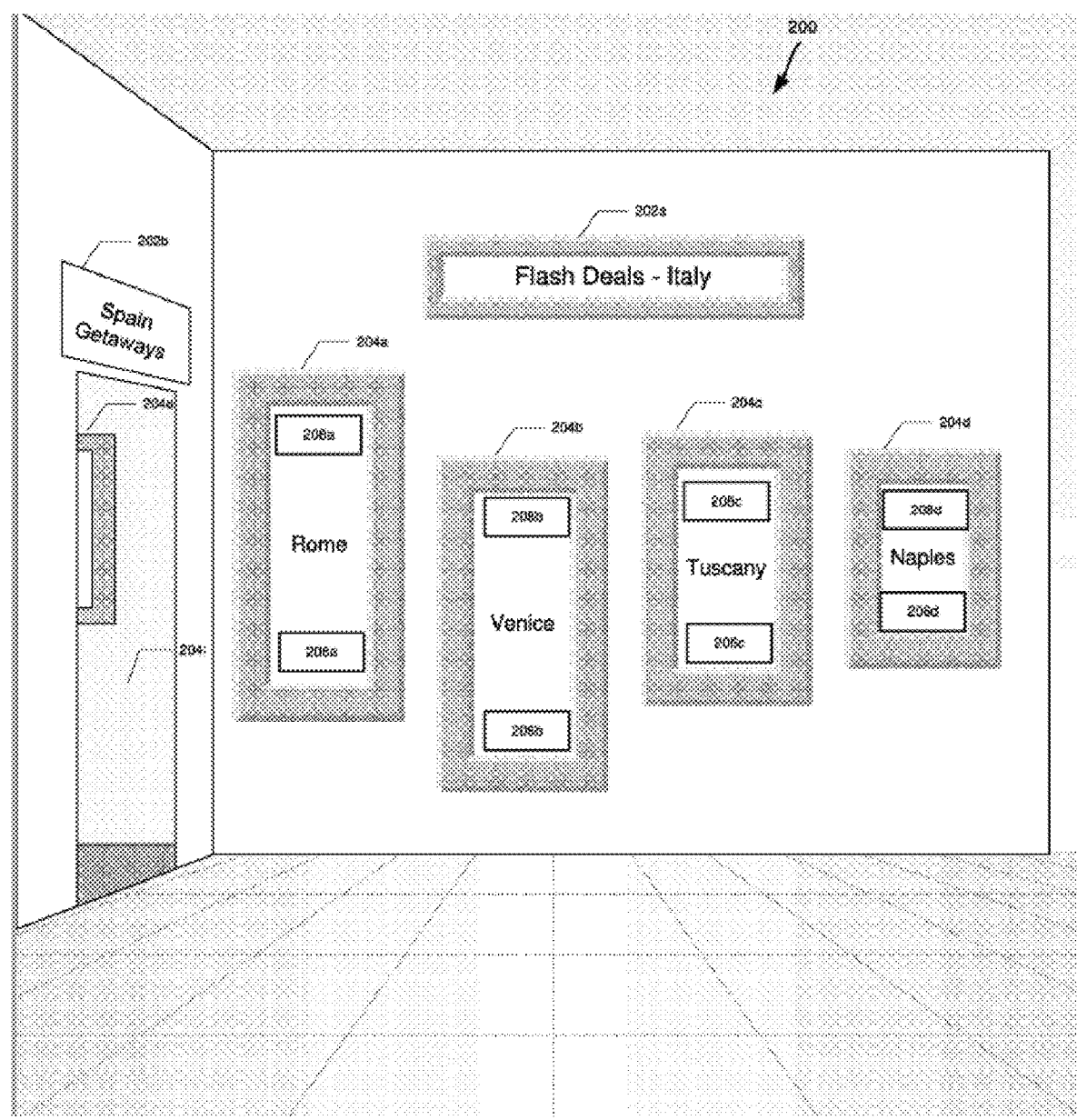
FIG. 2 illustrates an example first three dimensional interactive environment.

FIG. 2 depicts an example of a first 3D interactive environment 200. First 3D interactive environment 200 is a virtual reality shopping environment. In other embodiments, 3D interactive environment 200 may be any environment capable of displaying virtual interfaces, including, for example, a virtual reality mall, a virtual reality open market, and the like. Illustrated first 3D interactive environment 200 includes a virtual reality mall that includes multiple stores 202*a-b*. A user may manipulate the interactive device using various input means (described below) such that the processor of the interactive device updates the interactive device's display from store 202*a* store 202*b*. The processor of the interactive device updates the display such that to the user it appears that he is virtually moving through the 3D interactive environment. The stores contain virtual interfaces 204*a-e* corresponding to items. Virtual interfaces 204*a-e* are generated and displayed based on 3D environmental data (e.g., parameter and profile data of the user) and/or inventory data. In one embodiment, a processor of the interactive device receives inventory data from an inventory registry that identifies the availability of an item/promotion related to that item. If the item/promotion is available, the processor of the interactive device produces a virtual interface related to that item/promotion. Virtual interfaces 204*a-e* may be presented as posters, pictures, signs, banner, billboard, emblems, drawings, and the like. Virtual interfaces 204*a-e* contain one or more execution components 206*a-e* and one or more virtual experience portals 208*a-e*.

The depicted first 3D interactive environment 200 includes Italy store 202*a* and Spain store 202*b*. The Italy store contains virtual interfaces 204*a-d* related to vacations to Italy, and Spain store 202*b* contains virtual interfaces 204*e* related to a vacation to Spain. Virtual interfaces 204*a-e* are embodied as posters that depict various vacation destinations. For example, virtual interface 204*b* is a virtual poster depicting a promotion for a tour of Piazza San Marco, the Grand Canal, and/or Saint Mark's Basilica in Venice, Italy. A user may interact with virtual interface 204b, by selecting execution component 206b or virtual experience portal 208b using interactive device 100 or an associated user device. Virtual experience portal 208b may cause the interactive device to change from the first 3D interactive environment 200 to second 3D interactive environment 300 to allow the user to engage in a virtual experience of the tour of Piazza San Marco, Grand Canal, and/or Saint Mark's Basilica. In other embodiments, the user's engagement with execution component 206b indicates that the user wishes to purchase a promotion related to virtual interface 204b and execution data is generated by the interactive device. The execution data may contain payment information along with a promotion identifier. The processor of the interactive device sends the execution data to an execution registry. The execution data is received by the execution registry and the execution data may also be received by the inventory registry to update the inventory data. The execution data may also be received by a promotion and marketing service, and/or a provider. For example, if inventory data indicates that there are not any promotions available related to virtual interface 204b, then the processor of the interactive device may remove execution component 206b or make execution component 206b non-selectable, non-active, non-engagable, and the like. Furthermore, if inventory data indicates that there are more promotions available related to virtual interface 204b, then the processor of the interactive device may make the execution component 206b active, selectable, engagable and the like. In some embodiments, execution component 206b may automatically activate the virtual experience portal 208b.

Figure 3:
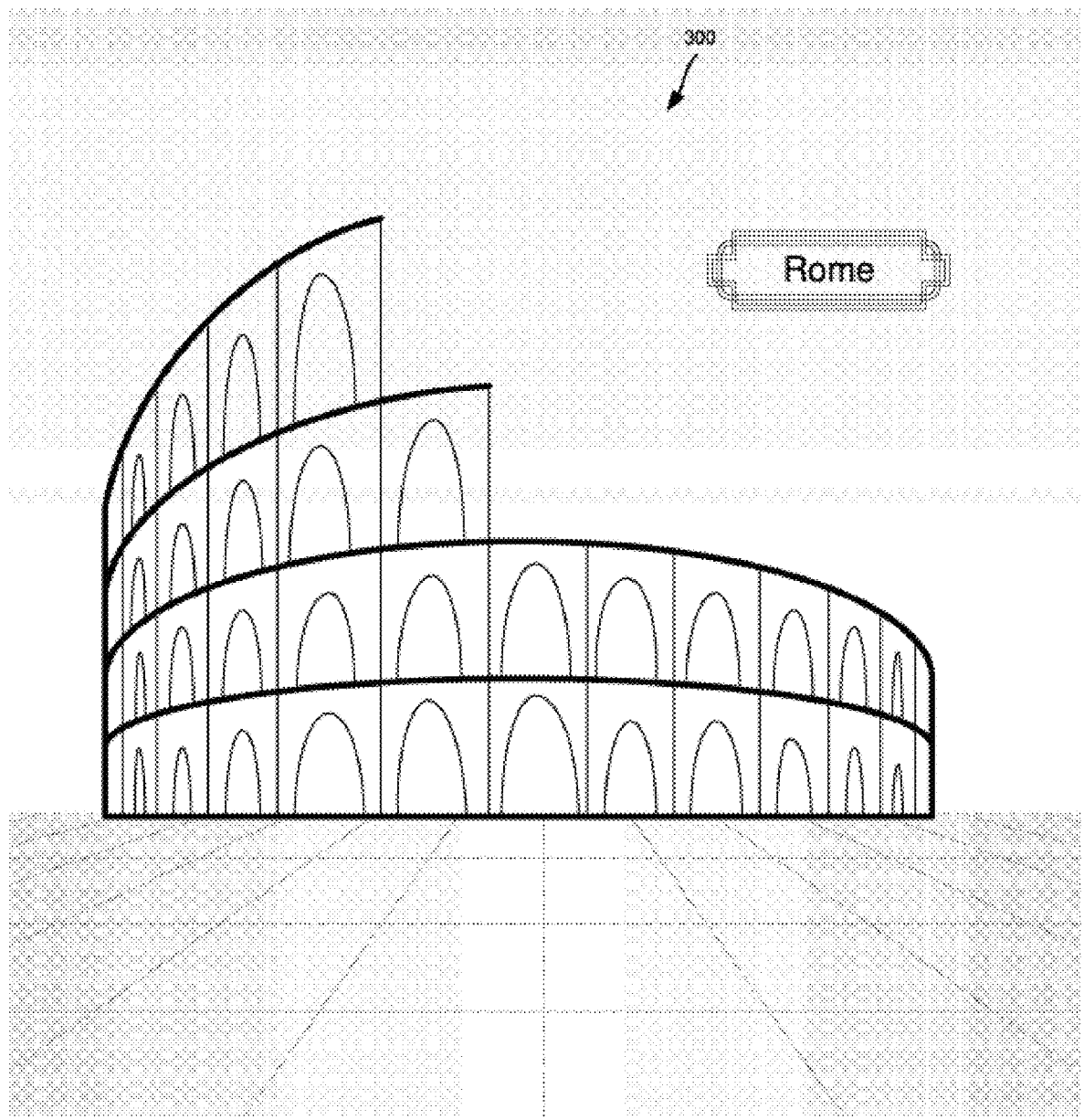
FIG. 3 illustrates an example second three dimensional interactive environment.

FIG. 3 depicts an example of a second 3D interactive environment 300. When the processor of the interactive device receives user input data indicating that a user selected a virtual experience portal in the 3D interactive environment the processor of the interactive device outputs a second 3D interactive environment. The interactive device may generate the depicted second 3D environment 300, for example, after the user virtually engages virtual experience portal 208a. In the second 3D interactive environment the user engages in a virtual experience related to a corresponding item. The depicted second 3D interactive environment 300 is a virtual representation of a trip to The Coliseum in Rome, Italy. In the second 3D interactive environment 300, the processor of the interactive device, outputs a simulation of the user viewing The Coliseum from a first person point of view. In addition, the sense stimuli module of the interactive device, simulates using audio, for example, the noise of the bustle of crowds of people around The Coliseum. The sense stimuli module of the interactive device may stimulate the user's senses in various ways, such as providing haptic feedback to simulate the feel of The Coliseum, audio generation to produce audio from other tourists that are present, a micro-heater to simulate the temperature at The Coliseum, and the like.

In some embodiments, multiple users of different interactive devices may simultaneously engage in the same first 3D interactive environment and/or second 3D interactive environment. The communication module (as shown in FIG. 5 item 406) of the different interactive devices may be utilized to connect the multiple interactive devices directly (e.g. a peer to peer system) or indirectly (e.g. connect to a hosting server). For example, each interactive device is assigned a unique identifier by a central server, and connects to the central server utilizing a connection to a network (as shown in FIG. 3). The central server acts a host and sends information to each interactive device to allow the multiple users to interact with each other in a seemingly real way such as allowing multiple users to talk with each other while viewing The Coliseum. The second 3D interactive environment 300 is implemented such that the user has a virtual experience corresponding to the related item. In some embodiments, while in the second 3D interactive environment 300, the sense stimuli module of the interactive device may stimulate only one of the user senses. For example, second 3D interactive environment 300 may just be a visual tour of The Coliseum, which does not provide audio or haptic feedback.

Network Environment

Figure 4A:
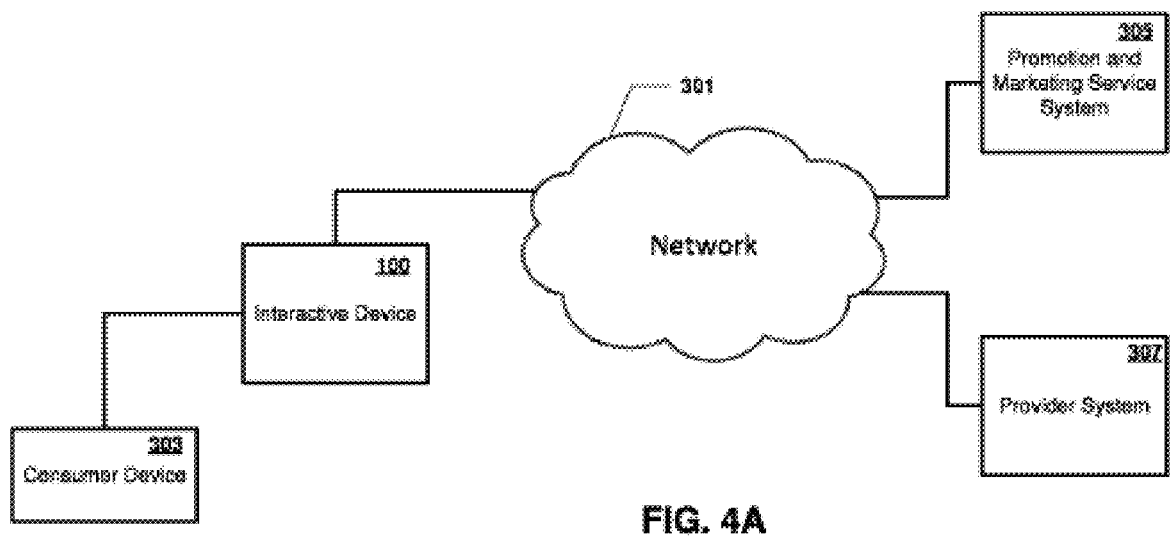
FIG. 4A illustrates an example system configured in accordance with some embodiments discussed herein.

FIG. 4A illustrates system 310 including an example network architecture for a system, which may include one or more devices and sub-systems that are configured to implement some embodiments discussed herein. For example, system 310 may include provider system 307, which can include, for example, the circuits disclosed in FIGS. 5-6, a provider server, or a provider database, among other things (not shown). The provider system 307 may include any suitable network server and/or other type of processing device. In one embodiment, the provider system 307 may determine and transmit commands and instructions relating to the use of interactive device 100, the purchase of promotions, the display of items related to the purchase of promotions, and/or generating and displaying an 3D interactive environment to user device 303, promotion and marketing service system 305, and/or interactive device 100.

Provider system 307 may communicate with the user device 303, interactive device 100, and/or promotion and marketing service system 305 using network 301. Network 301 may include nay wired or wireless communication network including a wired or wireless local area network (LAN), personal area network (PAN), metropolitan area network (MAN), wide area network (WAN), or the like, as well as any hardware, software and/or firmware required to implement it (e.g. network routers and network switches). For example, network 301 may include a cellular telephone, an 802.11, 802.16, 802.20 and/or WiMax network. Further, network 301 may include a public network, such as the Internet, a private network, such as an intranet, or combinations thereof, and may utilize a variety of networking protocols now available or later developed including, but not limited to TCP/IP based networking protocols.

Figure 4B:
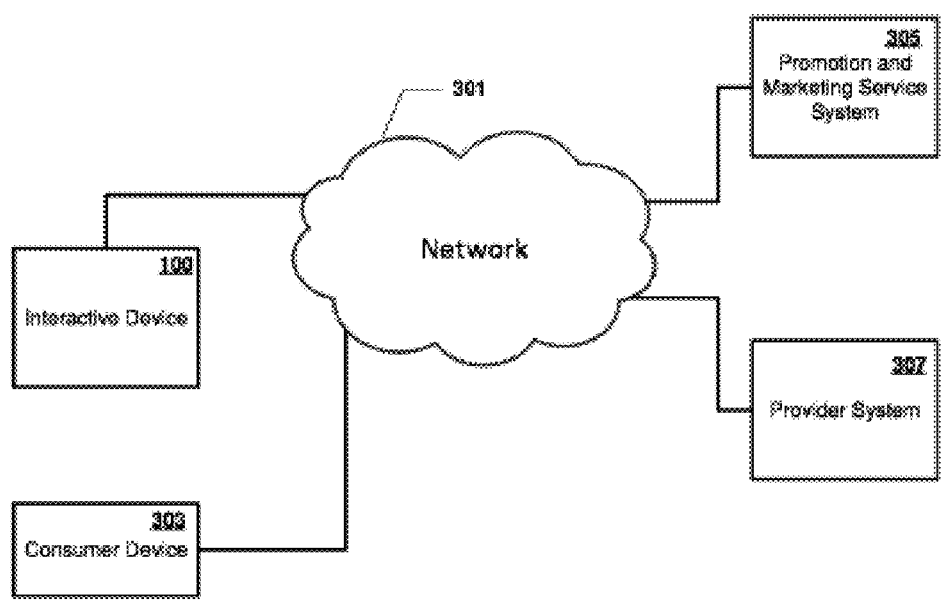
FIG. 4B illustrates an alternate example system configured in accordance with some embodiments discussed herein.

User device 303 (user device may also be referred to as consumer device) may be implemented as a personal computer and/or networked device, such as a cellular phone, tablet computer, mobile device, point of sale terminal, inventory management terminal etc., which may be used to aid interactive device 100. Although only one user device is depicted in FIG. 4A it is within the scope of this invention to include multiple user devices. In some embodiments, interactive device 100 may have a minimal amount of hardware and cannot perform large processing tasks, and user device 303 may act as interactive device's 100 processing power and/or provide navigation support for a user using interactive device 100 and/or facilitate communications between interactive device 100 and network 301. Interactive device 100 may be coupled to user device 303 by any suitable wireless or wired communication network, including, for example, a universal serial bus connection (USB), LAN, PAN, or the like, as well as any hardware, software (e.g., protocols) and/or firmware required to implement it. For example, interactive device 100 may be connected to user device 303 using an infrared, Bluetooth, wireless USB, Zigbee connection, Near Field Communication (NFC) and the like. In other embodiments, as illustrated in FIG. 4B interactive device 100 may have sufficient hardware to perform processing tasks and will not use user device 303 for processing support and/or communication support. In such an embodiment interactive device 100 may connect directly to network 301, but interactive device 100 may still connect to user device 303 for other functions (e.g. navigation functions).

Promotion and marketing service system 305 may be implemented separately or included in provider system 307. Promotion and marketing server system 305 may communicate with user device 303, interactive device 100 and/or provider system 307 using network 301. Promotion and marketing system 305 may determine and transmit commands and instructions related use of interactive device 100, the purchase of promotions, the display of items related to the purchase of promotions, and/or generating and displaying 3D interactive environment to user device 303, promotion and marketing service system 305, and/or interactive device 100.

FIG. 5 shows a schematic block diagram of circuitry 400, some of or all of which may be included in, for example, provider system 307, promotion and marketing system 305, user device 303, and/or interactive device 100. Any of the aforementioned systems or devices may include circuitry 400 and may be configured to, either independently or jointly with other devices in network 301 perform the functions of the circuitry 400 described herein. As illustrated in FIG. 5, in accordance with some example embodiments, circuitry 400 can include various means such as processor 402, memory 404, communications module 406, input/out module 408 and/or sensor registry (not shown). In some embodiments, 3D dimensional environment data module 410 and/or relevance system 414 may also or instead be included. As referred to herein, "module" includes hardware, software, and/or firmware configured to perform one or more particular functions. In this regard, the means of circuitry 400 may be embodied as hardware elements (e.g., a suitable programmed processor, combinational logic circuit, and/or the like), a computer program product comprising computer-readable program instructions stored on a non-transitory computer readable medium (e.g., memory 404) that is executable by a suitably configured processing device (e.g. processor 402), or some combination thereof.

Processor 402 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 5 as a single processor, in some embodiments processor 402 comprises a plurality of processors. The plurality of processors may be embodied on a single computing device or may be distributed across a plurality of computing devices collectively configured to function as circuitry 400. The plurality of processors may be in operative communication with each other and may be collectively configured to perform one or more functionalities of circuitry 400 as described herein. In an example embodiment, processor 402 is configured to execute instructions stored in memory 404 or otherwise accessible to processor 402. These instructions, when executed by processor 402, may cause circuitry 400 to perform one or more of the functionalities of circuitry 400 as described herein.

Whether configured by hardware, firmware/software methods, or by a combination thereof, processor 402 may comprise an entity capable of performing operations according to embodiments of the present invention while configured accordingly. Thus, for example, when processor 402 is embodied as an ASIC, FPGA or the like, processor 402 may comprise specifically configured hardware for conducting one or more operations described herein. Alternatively, as another example, when processor 402 is embodied as an executor of instructions, such as may be stored in memory 404, the instructions may specifically configure processor 402 to perform one or more algorithms and operations described herein, such as those discussed in connection with FIGS. 1-9.

Memory 404 may comprise, for example, volatile memory, non-volatile memory, or some combination thereof. Although illustrated in FIG. 5 as a single memory, memory 404 may comprise a plurality of memory components. The plurality of memory components may be embodied on a single computing device or distributed across a plurality of computing devices. In various embodiments, memory 404 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 404 may be configured to store information, data (including item data and/or profile data), applications, instructions, or the like for enabling circuitry 400 to carry out various functions in accordance with example embodiments of the present invention. For example, in at least some embodiments, memory 404 is configured to buffer input data for processing by processor 402. Additionally or alternatively, in at least some embodiments, memory 404 is configured to store program instructions for execution by processor 402. Memory 404 may store information in the form of static and/or dynamic information. This stored information may be stored and/or used by circuitry 400 during the course of performing its functionalities.

Communications module 406 may be embodied as any device or means embodied in circuitry, hardware, a computer program product comprising computer readable program instructions stored on a computer readable medium (e.g., memory 404) and executed by a processing device (e.g., processor 402), or a combination thereof that is configured to receive and/or transmit data from/to another device and/or network, such as, for example, a second circuitry 400 and/or the like. In some embodiments, communications module 406 (like other components discussed herein) can be at least partially embodied as or otherwise controlled by processor 402. In this regard, communications module 406 may be in communication with processor 402, such as via a bus. Communications module 406 may include, for example, an antenna, a transmitter, a receiver, a transceiver, network interface card and/or supporting hardware and/or firmware/software for enabling communications with another local or remote computing device and/or servers. Communications module 406 may be configured to receive and/or transmit any data that may be stored by memory 404 using any protocol that may be used for communications between computing devices. Communications module 406 may additionally or alternatively be in communication with the memory 404, input/output module 408 and/or any other component of circuitry 400, such as via a bus.

Input/output module 408 may be in communication with processor 402 to receive an indication of a user input and/or to provide an audible, visual, mechanical, or other output to a user (e.g., provider and/or consumer). Some example visual outputs that may be provided to a user by circuitry 400 are discussed in connection with FIGS. 1-9. As such, input/output module 408 may include support, for example, for a keyboard, a mouse, a user device, a computer, a joystick, a display, a touch screen display, a 3D display, a microphone, a speaker, a RFID reader, barcode reader, biometric scanner, mirco-heaters, micro-fans, haptic feedback devices, tactile feedback devices, and/or other input/output mechanisms. Input/output module 408 may receive various outputs from devices connected to input/output module 408 via communications module 406, for example GPS, accelerometer, gyroscope output from a connected user device. In embodiments wherein circuitry 400 is embodied as a server or database, aspects of input/output module 408 may be reduced as compared to embodiments where circuitry 400 is implemented as an end-user machine (e.g., user device 303 and/or interactive device 100) or other type of device designed for complex user interactions. In some embodiments (like other components discussed herein), input/output module 408 may even be eliminated from circuitry 400. Alternatively, such as in embodiments wherein circuitry 400 is embodied as a server or database, at least some aspects of input/output module 408 may be embodied on an apparatus used by a user that is in communication with circuitry 400. Input/output module 408 may be in communication with memory 404, communications module 406, and/or any other component(s), such as via a bus. One or more than one input/output module and/or other component can be included in circuitry 400.

Sense stimuli module 416 may be in communication with input/output module 408 to receive output audible, visual, mechanical, and other outputs. Sense stimuli module 416 may stimulate the user's senses in accordance with received output from the input/output module. For example, sense stimuli module may be a heater or fan to simulate weather, an odor generator to simulate smell, haptic feedback to simulate touch/feeling, and the like.

Device characteristics module 418 may be in communication with processor 402 to send information relating to the characteristics of the interactive device. Device characteristics module may comprise one or more other modules capable of determining past or current characteristics about the interactive device. For example, device characteristic module may include an accelerometer, gyroscope, GPS, and the like. Device characteristics may also indicate movement by the user of an interactive device.

3D dimensional environment data module 410 and relevance system 414 may also or instead be included and configured to perform the functionality discussed herein related to generating, arranging, presenting and/or editing a first or second interactive 3D environment. In some embodiments, some or all of the functionality of generating, arranging, presenting and/or editing a first or second interactive 3D environment and/or profile data may be performed by processor 402. For example, non-transitory computer readable media can be configured to store firmware, one or more application programs, and/or other software, which include instructions and other computer-readable program code portions that can be executed to control each processor (e.g., processor 402, interface module, and/or relevance system 414) of the components of system 400 to implement various operations, including the examples shown above. As such, a series of computer-readable program code portions are embodied in one or more computer program goods and can be used, with a computing device, server, and/or other programmable apparatus, to produce machine-implemented processes.

In some embodiments, a user parameters database 412 may be provided and includes profile data, and/or analytical engine data. As shown in FIG. 7A, profile data 610, in some embodiments, may include transaction data 620, biographical data 625, and/or preference data 630. Additionally or alternatively, the user parameters database 412 may include analytical engine data 605, which provides any additional information needed by the relevance system 414.

Figure 8:
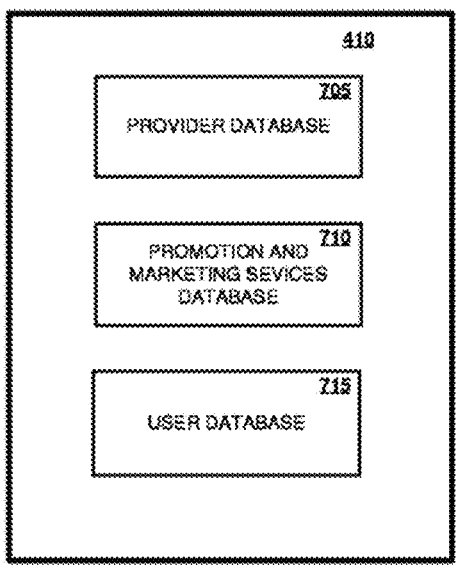
FIG. 8 illustrates an example three dimension data module configured to store item data in accordance with some embodiments discussed herein.

In some embodiments the 3D dimensional environment data module 410 may include a provider database 705, a promotion and marketing services database 710, and an user database 715 (as shown in FIG. 8). Data contained in the provider database 705, promotion and marketing services database 710, and user database 715 may collectively be referred to as item data. Interactive device 100 may consist of circuitry 400. Provider database 705, promotion and marketing services database 710, and user database 715 of 3D dimensional environment data module 410 may interact with components of circuitry 400.

Figure 6:
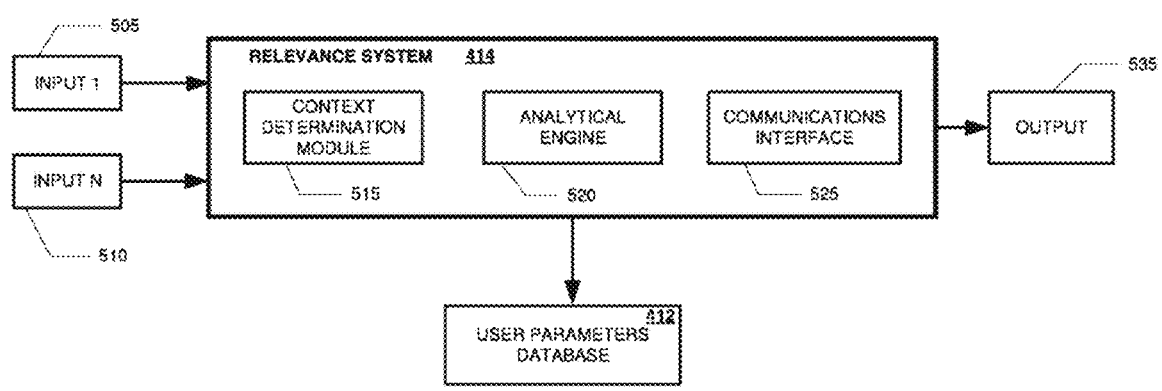
FIG. 6 illustrates an example relevance system configured in accordance with some embodiments discussed herein.
Figure 7:
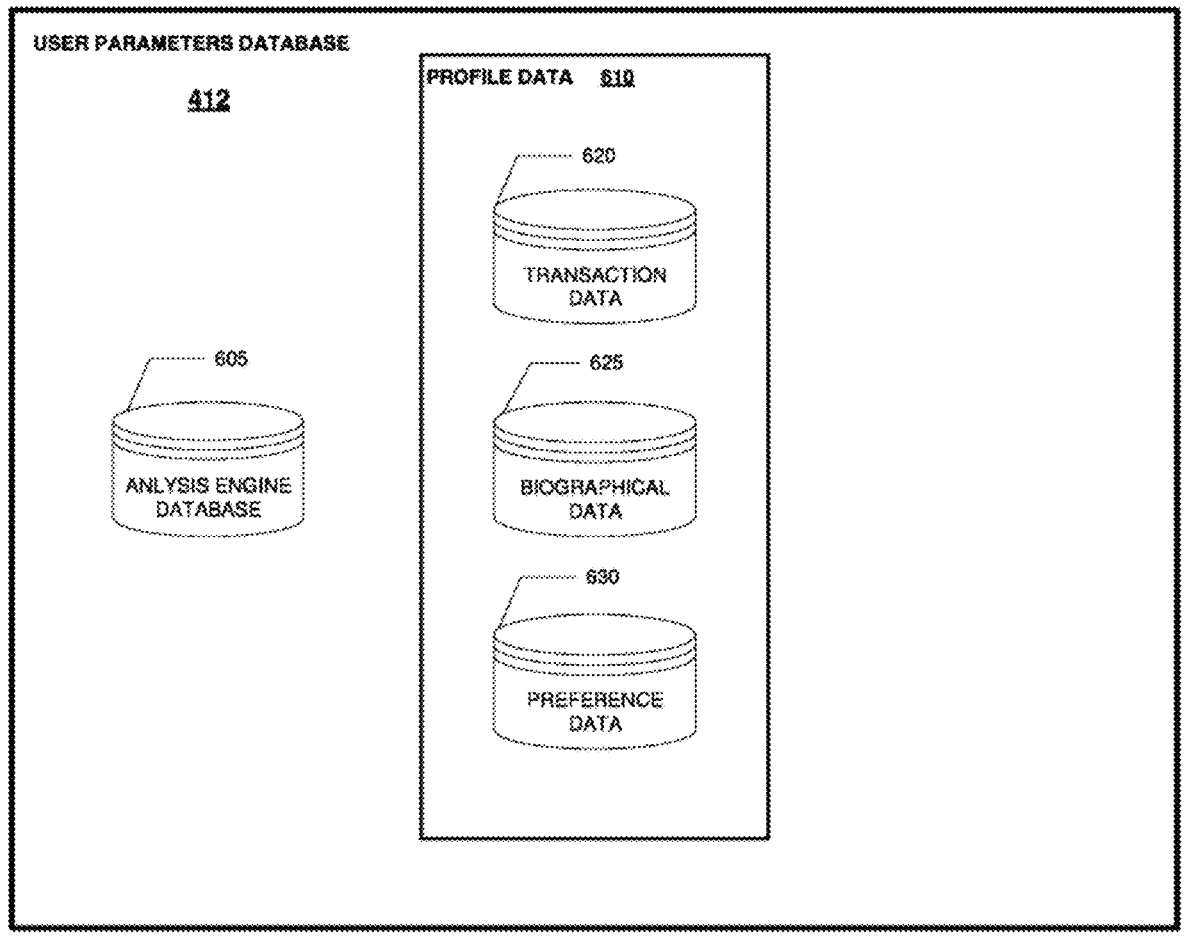
FIG. 7 illustrates an example user parameters database configured in accordance with some embodiments discussed herein.

FIG. 6 shows an illustrative schematic diagram of relevance system 414. Relevance system 414 may be used to calculate the relevancy score for virtual interfaces displayed in a first or second 3D interactive environment. Relevance system 414 may also be used to modify (e.g. configure) various aspects (e.g. default point of view) of the first or second 3D interactive environment and the user experience inside the first or second 3D interactive environment. Relevance system 414 may receive a plurality of inputs 505, 510 from the circuitry 400 and process the inputs within the relevance system to produce a relevance output 535, which may include a relevancy score. In some embodiments, the relevance system 414 may execute context determination 515, process the data in an analytical engine 520, and output the results via a communications interface 525. Each of these steps may pull data from a plurality of sources including the user parameters database 412.

When inputs 505, 510 are received by the relevance system 414, a context determination 515 may first be made. A context determination includes such information as a user preference data, what item or user are the items being compared to for the relevancy scoring, and under what circumstances has the interface or system has requested the relevancy information. These inputs may give context to the relevance system's 414 analysis to determine to what reference source the relevancy score is based. For example, the context determination module 515 may instruct the relevance system 414 to calculate relevancy scores based on a specific user. In some embodiments, the context determination module 515 may instruct the relevance system to calculate relevancy scores for virtual interfaces displayed in a first 3D interactive environment based on data for a specific location. The context determination module 515 may select any criteria based on any number of preferences and automatic determinations around which to calculate the relevancy scores.

The relevance system 414 may then compute the relevancy scores using the analytical engine 520. The analytical engine 520 draws information about the profile and the items from the user parameters database 412 and then, in light of the context determination module's 515 determination, computes a relevancy score for each of the items. The analytical engine 520, in some embodiments, may produce a hierarchy of relevancy scores for the items based on the similarities between a given item, or profile data, and each of the plurality of items. The analytical engine 520 may compare each item with the desired context 515 to determine the relevancy scores. The communications interface 525 then outputs 535 the relevancy scores to the local or remote circuitry 400 for use in generating a first or second 3D interactive environment, and/or a user's experience inside the first or second 3D interactive environment.

Additional descriptions of relevance determination algorithms for identifying promotions relevant to a consumer or other profile data that may be used alternatively or additionally are described in U.S. patent application Ser. No. 13/411, 502, filed Mar. 2, 2012, titled "RELEVANCE SYSTEM FOR CONSUMER DEALS", U.S. patent application Ser. No. 13/829,581 entitled "PROMOTION OFFERING SYSTEM" filed on Mar. 14, 2013, and U.S. patent application Ser. No. 12/776,028, now U.S. Pat. No. 8,355,948, titled "SYSTEM AND METHODS FOR DISCOUNT RETAILING" filed on May 7, 2010, the entirety of each is incorporated by reference herein.

In some embodiments, user device 303 or interactive device 100 may receive or access a profile identifier. The profile identifier may be received remotely, via wireless communication or tethered communication, or directly, via input into one of the devices 303 and 100. For example, in some embodiments, the customer may utilize interactive device 100 to interact with the user device 303 to transmit a profile identifier and other related profile data. In another example, a consumer may simply provide login credentials to the interactive device 100. The devices 303 and 100 may receive the profile identifier and transfer it to the circuitry 400. The circuitry 400 may then access the user parameters database 412 to retrieve profile data 610 associated with the profile identifier and transfer the profile identifier and/or the profile data to the relevance system 414.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of a local or networked system and/or circuitry 400. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 402, 3D dimensional environment data module 410, and/or relevance system 414 discussed above with reference to FIGS. 4-6, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 404) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Exemplary Operation

Figure 9:
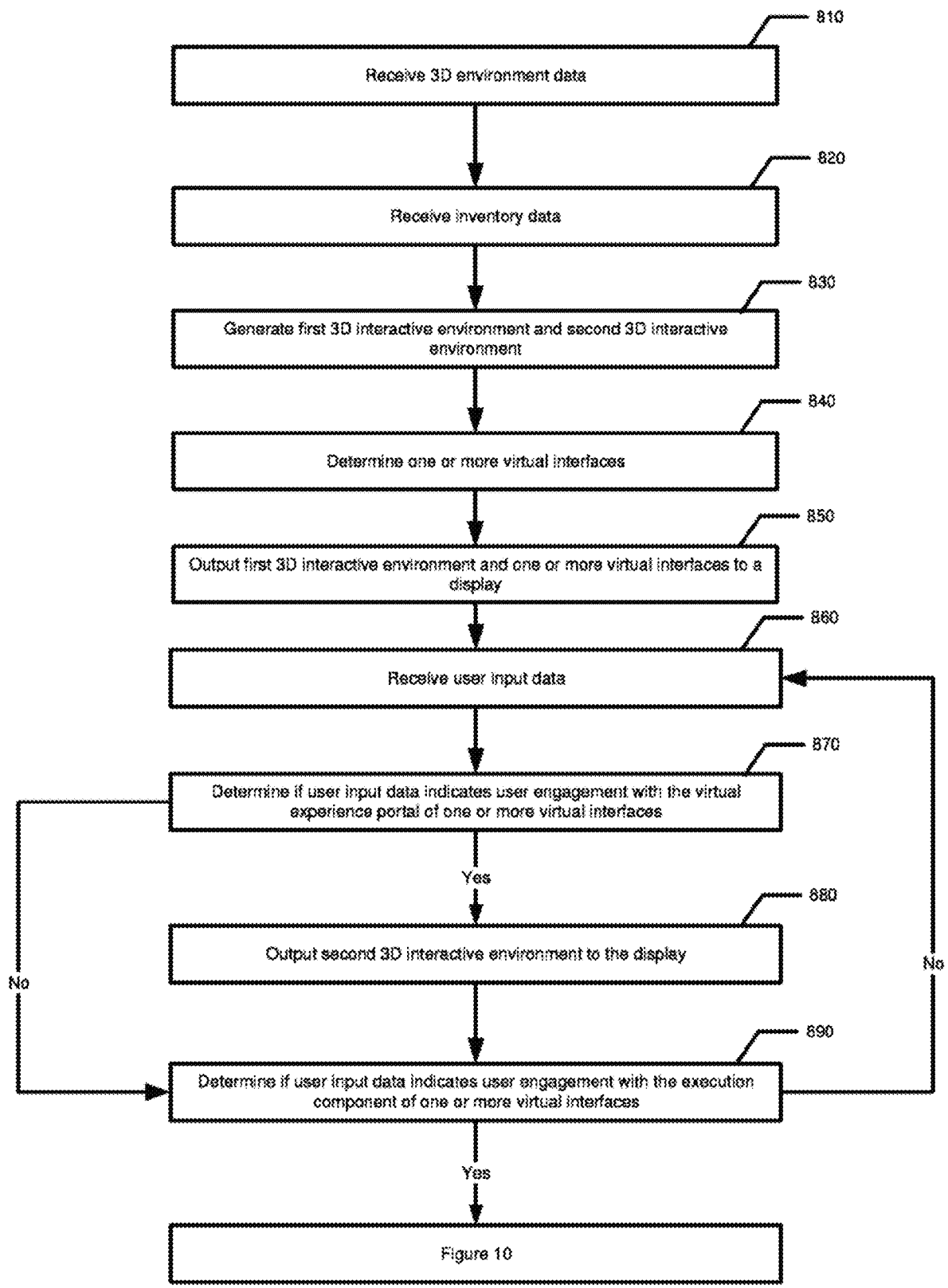
FIG. 9 illustrates a flow diagram of an example system in accordance with some embodiments discussed herein.

FIG. 9 illustrates an exemplary operation of an interactive device. Prior to step 810, the interactive device, optionally, authenticates a user. Authentication may be performed by any known authentication method, for example, username and password authentication, biometric authentication, location authentication (e.g. authenticating user based on the user's location), and the like. In an alternate embodiment, an associated user device coupled to the interactive device may perform the authentication. In other embodiments, authentication may be performed with the assistance of a provider system and/or a promotion and marketing service. After proper authentication the processor of the interactive device communicates with user parameters database 412 to determine the authenticated user's profile data.

At step 810, the processor of the interactive device receives 3D environment data from a user parameters database. In this embodiment, 3D environment data comprises of biographical information, transaction data, and preference data.

At step 820, the processor of the interactive device receives inventory data from an inventory registry.

At step 830, the processor of the interactive device uses the received 3D environment data generates a first and second 3D interactive environment. For example, if biographic information indicates the user is short, the processor of the interactive device will generate the first 3D interactive environment and/or second 3D interactive environment from a lower point-of-view (e.g. from a child's point-of-view). In some embodiments, only the first 3D interactive environment is generated at this point and the second 3D interactive environment is generated after step 850 but before step 880.

At step 840, the processor of the interactive device uses the received 3D environment data and received inventory data to determine one or more virtual interfaces. The first 3D interactive environment contains the determined one or more virtual interfaces. For example, a virtual interface may present a promotion for a trip to Florence, Italy. The layout of the virtual interfaces (e.g. where and what virtual interfaces are displayed and how the virtual interface are displayed) is automatically configured by the processor of the interactive device, using as input, data from the relevance system 414 and/or user parameters database 412. For example, the received 3D environment data includes biographical data of the user that indicates the user is a young child. The processor of the interactive device then modifies the layout of the virtual interfaces to display only virtual interfaces related to child-themed amusement parks or other child friendly promotions. In an alternate embodiment, the layout of the virtual interfaces may be manually customized by the user. In another embodiment, the processor of the interactive device may automatically modify the virtual interfaces layout may be modified using input the associated user device. For example, the processor of the interactive device receives GPS data from an associated user device indicating the interactive device is located in San Francisco, CA and the processor of the interactive device generates virtual interfaces related to promotions available in San Francisco, CA (e.g. tours of The Golden Gate Bridge, Ghirardelli Square, and/or Alcatraz). In another embodiment, the processor of the interactive device receives weather data from an associated user device or a weather service layout of the virtual interfaces is modified based on the weather data. For example, the processor of the interactive device, receives weather data (e.g. temperature, wind, precipitation information) indicating it is currently raining at the interactive device's location, and the processor of the interactive device modifies the layout of the virtual interfaces to emphasize (e.g. appear closer to the user, may appear bigger, and the like) virtual interfaces related to indoor promotions. In another example, if transaction data of the received 3D environment data indicates that the user frequently purchases items related to country artists, the analytical engine (item 520 in FIG. 6) of relevance system 414 may give a high relevancy score to virtual interfaces corresponding to country artists (e.g. a Blake Shelton concert) and processor of the interactive device may modify the layout of the virtual interfaces to contain bigger virtual interfaces corresponding to country concerts and smaller virtual interfaces corresponding to pop concerts. Although this description on uses a finite amount of 3D environment data to generate and customize the first 3D interactive environment, second 3D interactive environment, and one or more virtual interfaces it is within the scope of the invention to use any combination of 3D environment data to generate and customize the first 3D interactive environment, the second 3D interactive environment, and/or one or more virtual interfaces.

At step 850, the processor of the interactive device outputs to the display of the interactive device, the first 3D interactive environment containing one or more virtual interfaces. In some embodiments, the communication module of the interactive device connects to other interactive devices and the multiple interactive devices simultaneously output a shared first 3D interactive environment. The multiple users of the multiple interactive devices may interact with each other using a microphone and speaker associated with the interactive device. For example, a user may say to another user "Follow me, you've got to check out this store!" In other embodiments, the users may engage in games to win prizes related to promotions. For example, multiple users may interact in a virtual reality trivia game with questions about Greece, where the winner may receive a discount for a promotion relating to Greece.

At step 860, the processor of the interactive device receives user input data via the input/output module or device characteristics module related to the user's interaction with a virtual interface. The processor of the interactive device uses user input data to determine if the user has engaged or selected the virtual interface. To determine engagement, the processor of the interactive device compares received user input data with stored data in a sensor registry. The sensor registry contains sets of data of established motions and engagements. For example the interactive device receives audio data from an attached microphone that the user has spoken the phrase "select virtual portal." The processor will take this received data and compare it with data in the sensor registry to determine if the phrase matches a stored phrase. In this case the phrase "select virtual portal" is stored in the sensor registry as being associated with the action of activating a virtual portal, the processor activates the virtual portal. In another example, the sensor registry contains data from an accelerometer of a user performing a swipe motion and the swipe motion is associated with the action of engaging or selecting. If the processor of the interactive device receives user input data from the accelerometer indicating the same swipe motion the processor performs the engagement. In a broader example, the interactive device receives data from device characteristics module or input/output module indicating that a user pointed, swiped, grabbed, spoke, or performed another physical or audio gesture and the processor compares the received user input data to data in the sensor registry to determine whether to an appropriate action to take (e.g. navigation function, activate the virtual experience portal and/or an execution component, etc.)

At step 870, the processor of the interactive device determines if the received user input data indicates an engagement of a virtual experience portal of one or more virtual interfaces. If the determination is negative the process moves to step 890. However, if the determination is positive, at step 880, the processor of the interactive device and outputs a second 3D interactive environment. The second 3D interactive environment is a virtual representation or simulation based on an item related to the selected virtual experience portal. The second 3D interactive environment allows the user to virtually experience, a portion or all of a related item. As recited in step 830, the second 3D interactive environment is generated and customized by the processor of the interactive for the particular user using 3D environmental data. For example, the received 3D environment data includes user preference data indicating that the user prefers a first person point-of-view over a third person point-of-view. In this situation, the processor of the interactive device generates and outputs the second 3D interactive environment from the point-of-view of the user. In another example, if user input data indicates that the user selected the virtual experience portal on a virtual interface related to a concert (e.g. item) the processor of the interactive device will customize the second 3D interactive to virtually simulate the concert from the user's point-of-view, and the interactive device's sense stimuli module is used to stimulate user's senses to simulate attending the concert. In other embodiments, the second 3D interactive environment is presented from a birds-eye point-of-view to allow the user to simulate experience the item from a distance. Using the above example of a concert, the interactive device may display the second 3D interactive environment from a birds-eye point-of view such that the user is able to view the whole auditorium during the concert, and locate various facilities in the auditorium (e.g. concession stands, bathrooms, and the like). In some embodiments, the point-of-view may be altered while the interactive device is outputting the second 3D interactive environment. Using the above example of a concert, the interactive device may first output the second 3D interactive environment from the user's point-of-view for the first half of the concert, and then change the output the second 3D interactive environment to the performer's point-of-view for the second half of the concert. It is within the scope of the invention to generated and output multiple point of views of the second 3D interactive environment.

The second 3D interactive environment may be generated based item data corresponding to related item stored in a 3D dimensional environment data module. For example, if input data indicates that the user selects a virtual interface relating to a concert by Jimmy Buffet (i.e. an item), then the processor of the interactive device may access stored data in the 3D dimensional environment data module related to past Jimmy Buffet concerts. In another example, if input data indicates that the user selects a virtual interface relating to a concert by legendary hip-hop mogul Aubrey "Drake" Graham, the processor of the interactive device may access stored data in the 3D dimensional environment data module related other similar hip-hop artist (e.g. Jermaine Cole). Using received item data from the 3D dimensional environment data module, the processor of the interactive device is able to generate an accurate second 3D interactive environment to provide a realistic virtual experience.

In some embodiments, 3D dimensional environment data module includes a user database that comprises of user feedback data from users who previously used and/or experienced an item. The user feedback data may take the form of audio/video data (e.g. videos and pictures), location data (e.g. where someone was located while using or experiencing the item), opinion data (e.g. what the user thought about the item, the user's favorite part about the item, tips relating to the item) and the like. For example, when a user takes a trip to Naples, Italy (i.e. an item) the user may record various parts of the trip (e.g. seeing various landmarks, a boat ride, and the like) and upload those recordings to the 3D dimensional environment data module. In another embodiment, the second 3D interactive environment may be generated only from user feedback data from users that previously experienced the same item by the same provider. For example, the second 3D interactive environment related to a Sting concert (i.e. an item) provided by Live Nation™ (i.e. a provider) may be generated based only on user feedback data from users who previously attended a Sting concerts provided by Live Nation™. Similar information may be uploaded by other users who experienced or used the same or related items.

In some embodiments, 3D dimensional environment data module includes a provider database that comprises of provider generated data related to an item. The data may take the form of audio/video data (e.g. videos and pictures), descriptive data (e.g. description of what the user can expect to experience), answers to frequently asked questions, and the like. Descriptive data may include data related to the user's senses. For example, the provider of physical goods (i.e. an item) could provide haptic feedback information (i.e. descriptive data) that a user should feel when the user interacts with the good in the second 3D interactive environment. In a different example, the provider of a trip to Naples, Italy may upload to the 3D dimensional environment data module descriptive data indicating that the temperature in Naples, Italy at various times during the year. Based on this descriptive data, the processor of the interactive device may activate a mirco-heater in the interactive device while outputting the second 3D interactive environment to simulate temperature. In another example, a provider of a concert (i.e. an item) could upload to the provider database recent concert videos and/or backstage videos of the band performing at the concert. In another example, the provider of the concert could upload to the provider database recording sessions and/or backstage information for the band that is performing at the concert. Similar information may be uploaded by other providers, providing the same or similar items.

In some embodiments, 3D dimensional environment data module includes a promotion and marketing service database that comprises of promotion and marketing service generated data related to an item. The data may take the form of audio/video data (e.g. videos and pictures), descriptive data (e.g. description of what the user can expect to experience), answers the frequently asked questions, and the like. Descriptive data may include data related to the user's senses. For example, the promotion and marketing service may upload to the 3D dimensional environment data module haptic feedback information (i.e. descriptive data) indicating that a boat ride in Venice, Italy (e.g. an item) is very bumpy. Based on this descriptive data, the processor of the interactive device may implement haptic feedback in the interactive device during certain points of the second 3D interactive environment to simulate the boat ride. Similar information may be uploaded by other promotion and marketing services related to the same or similar items.

The type of data which the processor of interactive device uses to create the second 3D interactive experience may be limited by the user, the provider, and/or the promotion and marketing service. In some embodiments, the provider of an item may require, the second 3D interactive environment related to the provided item to be generated only using information related to that same item. For example, if the processor of the interactive device is generating a second 3D interactive environment for climbing Mt. Everest (i.e. an item), the second 3D interactive environment is generated only from data about climbing Mt. Everest, and not from data about climbing similar mountains.

In some embodiments, the item may be a good. For example when the related item is a golf club, the generated second 3D interactive environment may be a virtual driving range where the user can virtually swing the golf club. In another example where the related item is a lamp, the generated second 3D interactive may be a virtual room, where the user can experience using the lamp (e.g. seeing how bright it is in different rooms, comparing the lamp to other lamps, feeling the lamp.)

Although this description on uses a finite amount of 3D environment data to generate and customize the second 3D interactive environment, it is within the scope of the invention to use any combination of 3D environment data to generate and customize the second 3D interactive environment may be generated and using any 3D environment data.

At step 890, the interactive device determines if the user input data indicates engagement of an execution component. The execution component corresponds to a promotion of a related item. The promotion may be provided by a provider of the item and/or a promotion and marketing service. If the determination is negative then the process moves back to step 860. However if the determination is positive, the processor of the interactive device generates execution data. The generated execution data, via the processor is then sent to an execution registry for storage and analysis. The execution registry may be a database at a promotion and marketing service. In some embodiments, the processor of the interactive device accesses the execution registry, via a communications module, to update inventory data related to one or more promotions. The inventory data can be used by the processor of the interactive device to modify the first 3D interactive environment, second 3D interactive environment, and/or the virtual interfaces, and the like. For example, the processor of the interactive device, receives inventory data indicating that an offered promotion is no longer available then the processor of the interactive will modify the execution component on the corresponding virtual interface to be non-selectable.

The execution component is permanent or semi-permanent in the 3D interactive environment and/or the second 3D interactive environment. The sensor registry contains movements and engagement data that corresponds to the activation of the execution component. For example the interactive device receives audio data from an attached microphone that the user has spoken the phrase "select execution component." The processor will take this received data and compare it with data in the sensor registry to determine if the phrase matches a stored phrase. In this case the phrase "select execution component" is stored in the sensor registry and the phrase is associated with activating the execution component, thus the processor activates the execution component. In some embodiments, the execution may be invisible to the user, but still accessible by predetermined motivations and engagements stored in the sensor registry.

In some embodiments the execution component is presented while the second 3D interactive display is being output. In such an instance, the execution component can be activated during a virtual simulation related to an item. For example, the interactive device outputs a second 3D interactive environment that virtually simulates sitting front row at a Drake concert (i.e. an item). At the end of the simulation, a related promotion to purchase front row tickets for a Drake concert is output to the display of the interactive device as an execution component. If user input data indicates the user does not select the execution component the interactive device can generate another second 3D interactive environment that virtually simulates sitting in the balcony of the Drake concert. At the send of the simulation, a related promotion to purchase balcony tickets for a Drake concert is output to the display of the interactive device as an execution component. As has just been described, the interactive device may generated and output one or second 3D environments that corresponding to related execution components.

After the execution component is engaged, the payment authentication process starts as illustrated in FIG. 10. At step 905, the interactive device receives payment information from the user and/or to an associated user device. In one embodiment, payment information may be communicated from an associated user device to the via the communication module of the interactive device. The processor of the interactive device may then create a virtual rendering of the received payment information and output the virtual rendering inside the first or second 3D interactive environment. For example, the interactive device may receive payment information for a variety of credit cards or other payment options from the associated user device, and the interactive device outputs in the first or second 3D interactive environment engageable representations of each payment information. Once the payment information has been entered/selected it is sent to the provider system, via the interactive device or the associated user device.

At step 910, at the communications module of the interactive device or an associated user device transmits the selected payment information to the provider system. At step 915, the provider system processes the payment information. Processing payment information may be implemented by any know process or method for purchasing goods or services. In some embodiments, the interactive device itself authenticates and verifies the payment information instead of transmitting the payment information to the provider system for authentication and verification.

At step 920, a determination is made by the provider system if the payment was successful. If the payment was successful, at step 925, the purchased promotion is transmitted to the user. The promotion may be transmitted directly or indirectly to the user, via the interactive device and/or an associated user device. For example, the processor of the interactive device, receives confirmation for a successful purchase and then the processor of the interactive device outputs an alert in the first or second 3D environment that the purchase was successful. If the payment is not successful, then at step 930, an error indicating the failed payment of the promotion may be transmitted directly or indirectly to the user, via the interactive device and/or an associated user device. For example, the processor of the interactive device, receives confirmation of a failed purchase and then the processor of the interactive device outputs in the first or second 3D interactive environment an alert indicating that a promotion is not successfully purchased.

Although in FIG. 9-10 and elsewhere in the description the first 3D interactive environment and second 3D interactive environment have been described and embodied separately, it is within the scope of the invention to combine the functionality of the first 3D interactive environment and the second 3D interactive environment into a single 3D interactive environment.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. An interactive device comprising a processor and a memory associated with the processor having computer coded instructions configured to, with the processor, cause the interactive device to:
receive three dimensional environment data;
generate a first three dimensional interactive environment based on the three dimensional environment data;
generate a second three dimensional interactive environment based on the three dimensional environment data;
receive inventory data;
determine one or more virtual interfaces for presenting within the first three dimensional interactive environment, wherein the one or more virtual interfaces are determined based on the inventory data and the three dimensional environment data, and wherein the one or more virtual interfaces comprise an execution component configured to generate execution data, and a virtual experience portal;
output, to a display of the interactive device, the first three dimensional interactive environment and the one or more virtual interfaces;
receive user audio input data generated in association with user engagement of the interactive device;
in circumstances where the user audio input data indicates user selection of the execution component of the one or more virtual interfaces, store the associated execution data to a user execution registry; and
in circumstances where the user audio input data indicates user selection of the virtual experience portal of the one or more virtual interfaces, output to the display the second three dimensional interactive environment.

2. The interactive device of claim 1, further comprising communication circuitry configured to generate a network connection with other interactive devices, wherein the interactive device and other interactive devices substantially simultaneously output, to respective displays of the interactive device and the other interactive devices, shared versions of the first or second three dimensional interactive environment.

3. The interactive device of claim 1, wherein the three dimensional environment data comprises profile data.

4. The interactive device of claim 1, further configured to receive relevance data from a relevance system, wherein the three dimensional environment data comprises the relevance data.

5. The interactive device of claim 1, wherein the execution component is associated with a status defined based on the inventory data.

6. The interactive device of claim 1, wherein the processor causes the interactive device to activate the execution component in response to comparing the user audio input data to a sensor registry.

7. The interactive device of claim 1, wherein the second three dimensional interactive environment is generated based on item data.

8. The interactive device of claim 7, wherein item data comprises user feedback data.

9. The interactive device of claim 1, wherein the second three dimensional interactive environment comprises a virtual simulation of a part of at least one of: a vacation, a concert, or a trip.

10. The interactive device of claim 1, wherein the second three dimensional interactive environment comprises a virtual rendering of a good.

11. A method for presenting, via an interactive device, an interactive three dimensional environment, the method comprising:
receiving, by a processor, three dimensional environment data;
generating, by the processor, a first three dimensional interactive environment based on the three dimensional environment data;
generating, by the processor, a second three dimensional interactive environment based on the three dimensional environment data;
receiving, by the processor, inventory data;
determining, by the processor, one or more virtual interfaces for presenting within the first three dimensional interactive environment, wherein the one or more virtual interfaces are determined based on the inventory data and the three dimensional environment data, and wherein the one or more virtual interfaces comprise an execution component to generate execution data and a virtual experience portal;
outputting, by the processor, to a display of the interactive device, the first three dimensional interactive environment and the one or more virtual interfaces;
receiving, by the processor, user audio input data generated in association with user engagement of the interactive device;
in circumstances where the user audio input data indicates user selection of the execution component of the one or more virtual interfaces, storing, by the processor, the associated execution data to a user execution registry; and
in circumstances where the user audio input data indicates user selection of the virtual experience portal of the one or more virtual interfaces, outputting, by the processor, to the display the second three dimensional interactive environment.

12. The method of claim 11, further comprising generating, by communication circuitry, a network connection with other interactive devices the interactive device to other interactive devices;
substantially simultaneously outputting, to respective displays of the interactive device and the other interactive devices, by the interactive device and other interactive devices shared first or second three dimensional interactive environment.

13. The method of claim 11, wherein three dimensional environment data comprises profile data.

14. The method of claim 11, further comprising receiving relevance data from a relevance system, wherein the three dimensional environment data comprises the relevance data.

15. The method of claim 11, wherein the execution component is associated with a status defined based on the inventory data.

16. The method of claim 11, further comprises:
comparing, by the processor, the received user audio data with data in a sensor database; and
activating, by the processor, the execution component based on the comparison of the user audio data with the sensor database.

17. The method of claim 11, further comprises generating, by the processor, the second three dimensional interactive environment based on item data.

18. The method of claim 17, wherein the item data comprises user feedback data.

19. The method of claim 11, wherein the second three dimensional interactive environment comprises a virtual simulation of a part of a least at least one of: a vacation, a concert, or a trip.

20. A computer program product comprising non-transitory computer readable storage medium and computer program instructions stored therein, the computer program instructions comprising program instructions configured to:
receive, by a processor, three dimensional environment data;
generate, via the processor, a first three dimensional interactive environment based on the three dimensional environment data generate, via the processor, a second three dimensional interactive environment based on the three dimensional environment data
receive, via the processor, inventory data;
determine, via the processor, one or more virtual interfaces for presenting within the first three dimensional interactive environment, wherein the one or more virtual interfaces are determined based on the inventory data and the three dimensional environment data, and wherein the one or more virtual interfaces comprise an execution component generates execution data and a virtual experience portal;
output, via the processor, to a display of an interactive device, the first three dimensional interactive environment and the one or more virtual interfaces;
receive, via the processor, user audio input data generated in association with user engagement of the interactive device;
in circumstances where the user audio input data indicates user selection of the execution component of the one or more virtual interfaces, store, via the processor, the associated execution data to a user execution registry; and
in circumstances where the user audio input data indicates user selection of the virtual experience portal of the one or more virtual interfaces, output, via the processor, to the display the second three dimensional interactive environment.

\* \* \* \* \*

UNITED STATES PATENT AND TRADEMARK OFFICE
CERTIFICATE OF CORRECTION

PATENT NO. : 12,229,908 B2  
APPLICATION NO. : 18/503826  
DATED : February 18, 2025  
INVENTOR(S) : Scott Werner Page 1 of 1

It is certified that error appears in the above-identified patent and that said Letters Patent is hereby corrected as shown below:

In the Claims

In Column 26, Line 58, Claim 16, delete "audio data" and insert -- audio input data --, therefor.
In Column 26, Line 61, Claim 16, delete "audio data" and insert -- audio input data --, therefor.
In Column 27, Line 13, Claim 20, delete "data" and insert -- data; --, therefor.
In Column 27, Lines 13-15, Claim 20, delete "generate, via the processor, a second three dimensional interactive environment based on the three dimensional environment data" and insert the same at Line 14, as a new sub point.
In Column 27, Line 15, Claim 20, delete "data" and insert -- data; --, therefor.

Signed and Sealed this  
Sixteenth Day of September, 2025

Coke Morgan Stewart  
*Acting Director of the United States Patent and Trademark Office*